O. ANDERSON.
LOCK NUT.
APPLICATION FILED OCT. 3, 1913.

1,140,234. Patented May 18, 1915.

Inventor
Owen Anderson
By Victor J. Evans
Attorney

Witnesses

UNITED STATES PATENT OFFICE.

OWEN ANDERSON, OF CORONA, ALABAMA.

LOCK-NUT.

1,140,234.

Specification of Letters Patent.

Patented May 18, 1915.

Application filed October 3, 1913. Serial No. 793,252.

*To all whom it may concern:*

Be it known that I, OWEN ANDERSON, a citizen of the United States, residing at Corona, in the county of Walker and State of Alabama, have invented new and useful Improvements in Lock-Nuts, of which the following is a specification.

The present invention relates to nut locks, the primary object being to effectually sustain a nut in locked position upon a bolt, whereby neither of the elements may become accidentally disconnected, but also whereby the nut may be readily removed from the bolt as occasion requires.
A further object of the invention is to provide a bolt having its shank formed with peripheral grooves or depressions, provided each with a substantially straight wall, the second wall being curved from the periphery of the bolt to its juncture with the straight wall, and a nut for the bolt which is provided with a substantially L-shaped depression wherein is seated a pivoted spring pressed L-shaped dog, the engaging arm of the dog terminating in a curved wall which is adapted to engage with the curved wall of the groove of the bolt, and the said dog above its curved wall having a depression which provides an angular wall which engages with the straight wall of the groove of the bolt, the said angular portion terminating in a shoulder which overlies the periphery of the bolt adjacent the straight wall of its groove and whereby the locking dog engages with the bolt at three separate and distinct points to prevent the accidental separation of the bolt and nut, while such a separation is permitted by the longitudinal arm of the dog which swings the engaging portion thereof above the groove of the bolt.

With the above recited objects in view, and others which appear as the nature of the invention is understood the improvement resides in the novel construction, combination and operative arrangement of parts set forth in the following description and falling within the scope of the appended claim.

Figure 1:
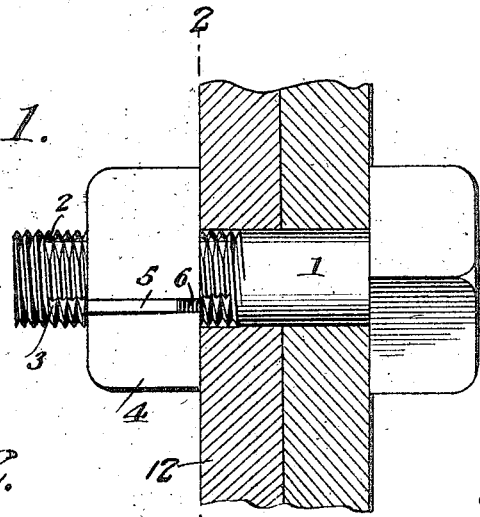
Figure 2:
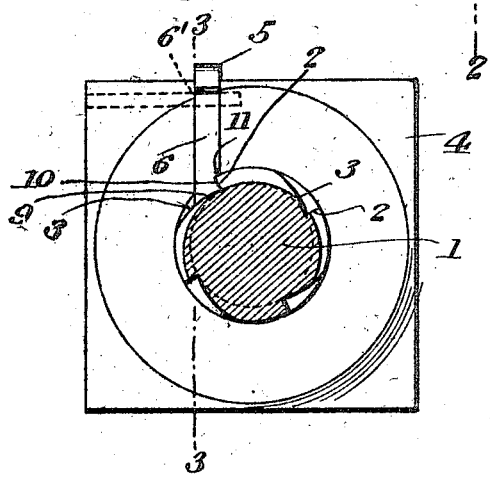
Figure 3:
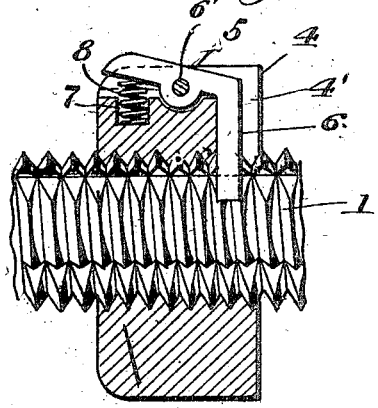
Figure 4:
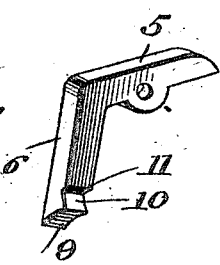

In the drawing: Figure 1 is an elevation of a nut and bolt constructed in accordance with the present invention, the same being shown applied to a series of plates or to a super-structure. Fig. 2 is a sectional view taken on the line 2—2 of Fig. 1. Fig. 3 is a longitudinal sectional view upon the line
3—3 in Fig. 2. Fig. 4 is a perspective view of the locking dog.

Like reference characters indicate corresponding parts throughout the several views.

In the showing of the drawing, 1 designates a bolt of the ordinary construction. This bolt has its threaded shank provided with a plurality of longitudinally arranged depressions each of which form a straight wall 2 and a curved wall 3 which is arranged angularly of the wall 2, and which gradually curves from the said wall to the periphery of the bolt.

The nut for the bolt is indicated by the numeral 4, and is also of the ordinary construction except that the same is provided upon one of its sides and upon its inner face with a substantially L-shaped depression 4' which serves as a pocket for a substantially L-shaped locking dog 5. What may be termed the vertical portion of the depression 4', or that portion which enters the bore of the nut is adapted to receive what I will term the locking arm 6 of the dog 5, while the horizontal channel provided by the pocket, and within which the second arm of the dog is pivotally connected, as at 6', is formed with a depression 7 for the reception of a helical spring 8 which exerts a pressure between the lower wall of the depression and the horizontal portion or member of the dog 5 to force its vertical arm 6 into engagement with the grooves in the bolt. The engaging arm of the L-shaped dog 5 has its lower end extending into the bore of the nut, and the extremity of the said arm is provided with an annular portion forming a lip 9. Directly above the curved wall 9, the said arm is provided with a depression which compresses an angular wall 10 which inclines in an opposite direction from that of the wall 9, the angular wall 10 terminating in a shoulder 11.

When the dog is in the position illustrated in Fig. 2, and by the full lines in Fig. 3, it will be noted that the wall 9 engages the curved portion 3 of one of the longitudinal depressions of the bolt, while its angular portion 10 engages with the straight wall 2 of the said depressed portion of the bolt, it being understood that when the nut is rotated to engaging position upon the bolt, or the bolt upon the nut, the said wall 2 will extend in an angular direction with relation to the sides of the dog. The shoulder 11 overlies the threads of the bolt directly adjacent its groove or depression, and so the dog engages the bolt at three distinct points, effectually preventing the accidental separation of the nut from the bolt. When the dog is in such engaging position, the horizontal or pivoted arm of the L-shaped dog has its free end of the tail elevated, by the spring 8, above the side of the nut, and when a wrench or like instrument is applied to the nut to engage with the tail of the dog, the said tail will be forced within the longitudinal portion of the pocket 4', and thus swing the engaging portion of the arm 6 out of the groove or depression of the bolt, to permit of the removal of the nut and bolt.

In Fig. 1 the nut and bolt are shown as securing elements of a super-structure made up of a plurality of plates 12, and from the above description taken in connection with the accompanying drawings the simplicity and the advantages of the device is apparent to those skilled in the art, to which such invention appertains without further detailed description.

Having thus described my invention, I claim as new:

In combination with a bolt having its shank provided with spaced longitudinal depressions, each of which provides a straight wall, a nut for the bolt, said nut having one of its faces and one of its sides to one side of the center of its bore formed with an L-shaped pocket, one of the portions of which enters the bore of the nut, an L-shaped spring pressed dog pivoted within the pocket, the engaging arm of the dog having its end notched to provide an angular wall and a shoulder, the straight wall of the depression in the bolt when in contact with the angular wall of the engaging arm of the dog being disposed at an angle with relation to the sides of the dog, so as to prevent the dog from moving to unlocking position.

In testimony whereof I affix my signature in presence of two witnesses.

OWEN ANDERSON.

Witnesses:
R. Garden,
A. Shapiro.